(12) United States Patent
Shears et al.

(10) Patent No.: US 8,052,176 B2
(45) Date of Patent: Nov. 8, 2011

(54) CONNECTION APPARATUS AND METHOD

(75) Inventors: Carl Shears, Aberdeenshire (GB); Sigurd Solem, Grestedbro (DK)

(73) Assignee: Pedem Limited, Aberdeen (GB)

( * ) Notice: Subject to any disclaimer, the term of this patent is extended or adjusted under 35 U.S.C. 154(b) by 208 days.

(21) Appl. No.: 11/159,395

(22) Filed: Jun. 23, 2005

(65) Prior Publication Data
US 2005/0287854 A1    Dec. 29, 2005

(30) Foreign Application Priority Data

Jun. 23, 2004 (GB) .................................... 0413998.6

(51) Int. Cl.
*F16L 25/00* (2006.01)
*F16L 35/00* (2006.01)

(52) U.S. Cl. ........................................ 285/333; 285/355
(58) Field of Classification Search .................. 285/333, 285/355, 390
See application file for complete search history.

(56) References Cited

U.S. PATENT DOCUMENTS

| | | | |
|---|---|---|---|
| 4,192,533 A * | 3/1980 | Blose | 285/334 |
| 4,525,001 A | 6/1985 | Lumsden et al. | |
| 4,572,549 A * | 2/1986 | Sidwell | 285/39 |
| 4,629,221 A | 12/1986 | Lumsden et al. | |
| 4,676,529 A | 6/1987 | McDonald | |
| 4,753,460 A * | 6/1988 | Tung | 285/331 |
| H1329 H * | 7/1994 | Bailey et al. | 285/334 |
| 5,681,059 A | 10/1997 | Mackie | |
| 6,305,723 B1 | 10/2001 | Schutz et al. | |
| 2003/0168858 A1 * | 9/2003 | Hashem | 285/334 |
| 2005/0284665 A1 | 12/2005 | Shears et al. | |

FOREIGN PATENT DOCUMENTS

| EP | 0 916 883 A1 | 5/1999 |
|---|---|---|
| FR | 2 281 488 | 3/1976 |

* cited by examiner

*Primary Examiner* — William P Neuder
*Assistant Examiner* — Cathleen Hutchins
(74) *Attorney, Agent, or Firm* — Foley & Lardner LLP (57) ABSTRACT

A connection apparatus is adapted to allow connection of one substantially tubular member to another substantially tubular member. The connection apparatus includes a male connecting member and a female connecting member. Cooperating attachment mechanisms are provided on the male and female connecting members. Each of the male and female connecting members includes at least one primary surface adapted to form a primary joint and at least one secondary surface adapted to form a secondary joint. The at least one primary surface may be adapted to form a primary load bearing shoulder joint. The at least one secondary surface may be adapted to form a secondary load bearing shoulder joint. The connection apparatus may provide a double shoulder high torque connection for downhole tubular members. A double acting hydraulic jar is also disclosed.

28 Claims, 6 Drawing Sheets

CONNECTION APPARATUS AND METHOD

CROSS-REFERENCE TO RELATED APPLICATIONS

This application claims priority to GB 0413998.6, which was filed on Jun. 23, 2004 and which is incorporated by reference herein in its entirety.

BACKGROUND

The present invention relates to a connection apparatus and particularly, but not exclusively, to a double shoulder high torque connection used to connect tubular members in a drill string such as tubular members that connect together to form the outer housing of a downhole tool.

Threaded connection joints such as tapered pin and box joints are used widely in the drilling industry to allow a series of tubular members and components, which make-up downhole tools and which are connected on the drilling rig, to form a drill string for insertion into the borehole.

Standard connection joints for drill strings may include a tapered male member (pin) on the lower end of one tubular member that may be inserted into a tapered female member (box) on the upper end of another tubular member such that a single shoulder is provided into which a reasonable amount of torque can be applied. However, the weakness created in the drill string at the drill pipe and tool component connections has the disadvantage of creating deformation of the joint and/or drill string when a large torsional load is placed upon it.

In recent years it has become known to use tapered thread double shoulder connections in drill pipe joints, such as the eXtreme™ Torque Connection XT™ drill pipe tool joint offered by Grant Prideco of Houston, Tex., USA, which allow higher levels of make-up torque to be applied to the drill pipe connections, which are required for extended reach and/or horizontal drilling and other extreme drilling applications. However, hitherto, it has been impossible to provide similarly high levels of make-up torque to downhole tool component connections. Hence, conventional downhole tool component connections constitute low torque connections, which denigrate the torque rating of the whole drill string.

What is needed, therefore, is an apparatus and a methodology that address at least one if not more of the deficiencies that afflict conventional practice, as previously described.

SUMMARY

According to a first embodiment of the present invention, there is provided connection means adapted to allow connection of one substantially tubular member to another substantially tubular member, the connection means including, among other possible things: a male connecting member; a female connecting member; and co-operable attachment means provided on the male and female connecting members. The male and female connecting members each comprise at least one primary surface adapted to form a primary joint and further each comprise at least one secondary surface adapted to form a secondary joint.

According to the first embodiment of the present invention, there is also provided a male connecting member for a substantially tubular member which is arranged for connection to a female connecting member of another substantially tubular member, the male connecting member including, among other possible things: an attachment means co-operable with an attachment means provided on the female connecting member; and at least one primary surface adapted to form a primary joint with at least one primary surface provided on the female member; and at least one secondary surface adapted to form a secondary joint with at least one secondary surface provided on the female member.

According to the first embodiment of the present invention, there is also provided a female connecting member for a substantially tubular member which is arranged for connection to a male connecting member of another substantially tubular member, the female connecting member including, among other possible things: an attachment means co-operable with an attachment means provided on the male connecting member; and at least one primary surface adapted to form a primary joint with at least one primary surface provided on the male member; and at least one secondary surface adapted to form a secondary joint with at least one secondary surface provided on the male member.

The tubular member may connect with another tubular member in accordance with the first embodiment of the present invention to form at least part of the outer housing of a downhole tool for incorporation into a string of downhole tubular members such as drill string.

An end the male member may be adapted for insertion into an end of the female member.

The at least one primary surface may be adapted to form a primary load bearing shoulder joint and the at least one secondary surface may be adapted to form a secondary load bearing shoulder joint. The primary and secondary joints may be formed between the male and female connecting members when the male and female connecting members are connected to one another.

The co-operable attachment means of the male and female connecting members may retain the primary surface of the male connecting member in abutment with the primary surface of the female connecting member.

The co-operable attachment means of the male and female connecting members may retain the secondary surface of the male connecting member in abutment with the secondary surface of the female connecting member.

The co-operable attachment means of the male and female connecting members may retain the primary and secondary surfaces of the male connecting member in abutment with the respective primary and secondary surfaces of the female connecting member, perhaps in order to create the respective primary and secondary joints between the male and female members. Moreover, at least one of the primary and secondary joints may at least partially resist rotation of one of the connecting members with respect to the other in at least one direction.

This has the advantage that embodiments of the invention provide a pair of butting surfaces (between each pair of primary and secondary surfaces) between the male and female members which resist rotation of the members with respect to one another.

The attachment means may include a thread on the male member which is co-operable with a corresponding thread on the female member. Moreover, the thread may force the or each primary and/or secondary surface of the connecting members into abutment with the corresponding surface of the other connecting member. The thread provided on the male and female members may include a substantially parallel thread that, in turn, may include a longitudinal axis which is substantially parallel to a longitudinal axis of the respective tubular member. This provides the advantage that the attachment means has a minimized radial extent which means that the inner bore of the connection members is substantially unrestricted at the location of the connection members.

Optionally in alternative embodiments, the thread provided on the male and female members may comprise a linearly tapered thread which is at an angle to the central longitudinal axis of the respective tubular member, where the thread angle may be arranged with one end of the thread radially closer to the central longitudinal axis of the connecting members than the other end of the thread.

The primary surface of the female member may be located radially outwardly of the secondary surface; the secondary surface of the female member is located closer to the central longitudinal axis of the female connecting member than the primary surface.

The primary surface of the male member may be located radially outwardly of the secondary surface; the secondary surface of the male member is located closer to the central longitudinal axis of the male connecting member than the primary surface.

The respective attachment means of the male and female members may be located in between the respective primary and secondary surfaces.

The primary surface of the female member may include a longitudinally outermost end of the female member and may be provided at an end of the female member which is longitudinally and radially outer of the female member attachment means. The secondary surface of the female member may be distal of the longitudinally outermost end of the female member and may be provided radially and longitudinally inner of the female member attachment means.

The secondary surface of the male member may include a longitudinally outermost end of the male member and may be provided at an end of the male member which is radially inner and longitudinally outer of the male member attachment means. The primary surface of the male member may be distal of the longitudinally outermost end of the male member and may be provided radially outer and longitudinally inner of the male member attachment means.

The primary surface of the male member may include an at least partially tapered end which may form a shoulder portion and which may comprise a tapered portion angled with respect to an axis perpendicular to the longitudinal axis of the male member. The said tapered portion of the male member primary surface shoulder portion may be angled, from radially innermost to outermost, in the direction toward the rest of the male connecting member and which may be angled, from radially innermost to outermost, in the direction toward the male member attachment means. The said tapered angle may be in the region of 1 degree to 45 degrees, e.g., in the region of 10 to 20 degrees.

The primary surface of the female member may include a female shoulder portion and which may comprise a tapered portion angled with respect to an axis perpendicular to the longitudinal axis of the female member. The said tapered portion of the female member primary surface shoulder portion may be angled, from radially innermost to outermost, in the direction toward the rest of the female connecting member and which may be angled, from radially innermost to outermost, in the direction toward the female member attachment means, perhaps by a substantially similar angle as that of the tapered portion of the male member primary surface shoulder portion such that the female member, and moreover, the longitudinally outermost end of the female member may be substantially prevented from moving radially outward when connected to the male member.

The secondary surface of the male member may include an at least partially tapered end which may form a shoulder portion and which may comprise a tapered portion angled with respect to an axis perpendicular to the longitudinal axis of the male member. The said tapered portion of the male member secondary surface shoulder portion may be angled, from radially innermost to outermost, away from the rest of the male connecting member and which may be angled, from radially innermost to outermost, away from the male member attachment means. The said tapered angle may be in the region of 1 degree to 45 degrees, e.g., in the region of 10 to 20 degrees.

The secondary surface of the female member may include a female shoulder portion and which may comprise a tapered portion angled with respect to an axis perpendicular to the longitudinal axis of the female member. The said tapered portion of the female member secondary surface shoulder portion may be angled, from radially innermost to outermost, away from the rest of the female connecting member and which may be angled, from radially innermost to outermost, away from the female member attachment means, perhaps by a substantially similar angle as that of the tapered portion of the male member such that the male member, and moreover, the longitudinally outermost end of the male member may be substantially prevented from moving radially inward when connected to the female member.

The primary and secondary surfaces of the male and female connecting members may also include support means which may further comprise a support platform or ledge adapted to support the respective longitudinally outermost ends of the male and female members when the connection means is engaged such that the male member is substantially prevented from moving radially outward and the female member may be substantially prevented from moving radially inward. The support means may be provided in the form of a surface, which may be a platform or ledge and which may be arranged to lie on an axis substantially parallel or co-axial to the longitudinal axis of the respective male and female connecting members.

The support means of the primary surface of the male member may be arranged radially inwardly of and longitudinally outwardly of the male member primary surface tapered portion and is further arranged radially outwardly of and longitudinally inwardly of the male member attachment means. The support means of the secondary surface of the male member may be arranged radially outwardly of and longitudinally inwardly of the male member secondary surface tapered portion and is further arranged radially inwardly of and longitudinally outwardly of the male member attachment means.

The support means of the primary surface of the female member may be arranged radially inwardly of and longitudinally inwardly of the female member primary surface tapered portion and is further arranged radially outwardly of and longitudinally outwardly of the female member attachment means. The support means of the secondary surface of the female member may be arranged radially outwardly of and longitudinally outwardly of the female member secondary surface tapered portion and is further arranged radially inwardly of and longitudinally inwardly of the female member attachment means.

The combined effect of the support means and tapered surfaces has the advantage that they substantially prevent movement (such as buckling when the connection means is being made up to high levels of torque) of the male and female connection members in the radial direction.

Optionally, the male connection member may be provided on one end of a body member and the female member provided on the other thereby creating a double shouldered connection which is capable of remaining engaged when a high torque is applied to it. Alternatively, one of a male or female member may be provided on one end of the member only, or in a further alternative, either a male or female member may be provided on each end of the body member.

The substantially tubular members may be members which are included in or make-up a drill string and may be members provided on or in a drilling jar, impact enhancing tool, drill pipe, flow circulation tool, shock tools, thrusters and bumper subs or other suitable tools, such as any suitable Bottom Hole Assembly (BHA) tools.

According to a second embodiment of the present invention, there is provided a jar mechanism that includes, among other possible things: an outer body member; an inner body member movably mounted in the outer body member; and a releasable locking mechanism operable between a locked configuration and an unlocked configuration. The releasable locking mechanism includes, among other possible things, a locking member provided on one of the outer and inner body members. The locking member is engageable with a locking formation provided on the other of the outer and inner body members. The releasable locking mechanism is adapted to permit the inner body member to be locked with respect to the outer body member when in the locked configuration and to allow the inner body member to move with respect to the outer body member when in the unlocked configuration.

At least a portion of the releasable locking mechanism, which may be the locking member, may be moveable in a radial direction between the locked and unlocked configurations. The locking member may be biased, perhaps by a biasing means, into the locked configuration. Moreover, the releasable locking mechanism may include a first angled surface utilized in the locked configuration and a second angled surface utilized in the unlocked configuration. The first and second angled surfaces may be provided on at least one of the locking member and biasing means. The biasing means may include at least one moveable member, which may be an annular ring, and a biasing device such as a spring device. The spring device may act to bias the moveable member in a direction of movement substantially parallel to a longitudinal axis of the jar mechanism.

The locking member may be held in the locked configuration by the first angled surface which may be an angled tapered surface perhaps angled with respect to an axis perpendicular to the longitudinal axis of the inner and outer members, the first angled surface may be provided on the at least one moveable member which may be a tapered ring member.

The locking member may be held in the unlocked position by a portion of the inner member apart from the locking formation, said portion may be the outer circumference of the inner member. The locking member may be held against the outer circumference of the inner member by the second angled surface which may be angled to a lesser degree than the first tapered surface, the second angled surface may be provided on the at least one tapered ring member.

This provides embodiments of the invention with the advantage that the locking member may be held in the locked configuration with a relatively large force due to the first (high angled) tapered surface, and against the normal outer circumference of the inner member when in the unlocked configuration with a relatively weak force due to the second (low angled) tapered surface. Such an arrangement reduces the friction of each locking member acting upon the inner member when in the unlocked configuration while providing sufficient locking force when in the locked configuration.

The locking member may include at least one inwardly projecting member adapted to interact with the locking formation on the inner member. Moreover, a plurality of inwardly projecting members may be provided on the locking member.

The locking formation on the inner member may include at least one groove adapted to interact with the or each inwardly projecting member provided on the locking member. Moreover, a plurality of grooves may be provided on the inner member.

A pair of tapered ring members may be provided on either side of the locking member.

A plurality of locking members may be provided, perhaps spaced apart around the circumference of the inner member.

These and other features, aspects, and advantages of the present invention will become more apparent from the following description, appended claims, and accompanying exemplary embodiments shown in the drawings.

DETAILED DESCRIPTION

Embodiments of the invention are illustrated in the drawings. An effort has been made to use the same, or like, reference numbers throughout the drawings to refer to the same or like parts.

Figure 4A:
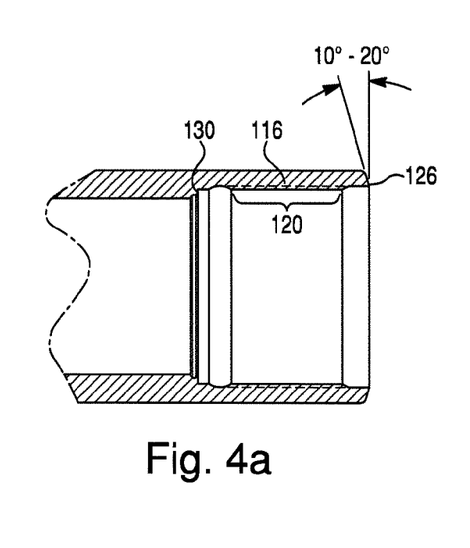
FIG. 4A is a cross-sectional view of a female end connector in accordance with the first embodiment of the present invention.
Figure 4B:
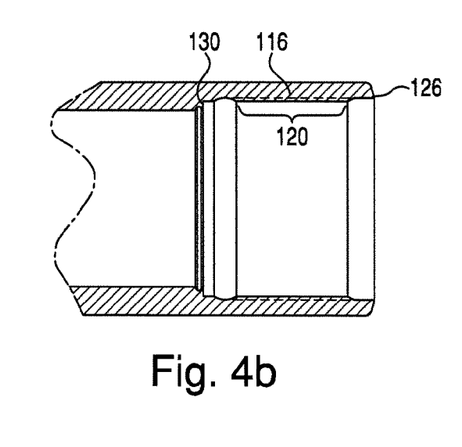
FIG. 4B is a further cross-sectional view of a female end connector in accordance with the first embodiment of the present invention.
Figure 4C:
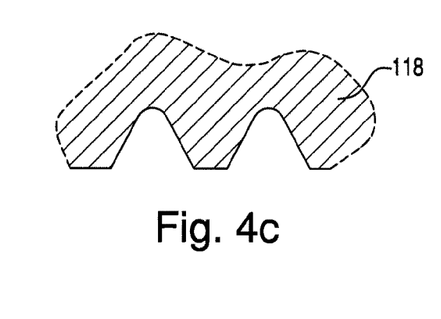
FIG. 4C is a detailed view of an internal screw thread of the female connector of FIGS. 4A and 4B.
Figure 5A:
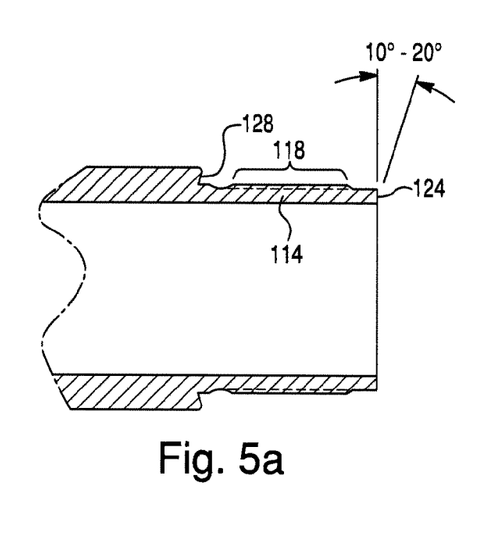
FIG. 5A is a cross-sectional view of a male end connector to be used in conjunction with the female end connector of FIGS. 4A-4C in accordance with the first embodiment of the present invention.
Figure 5B:
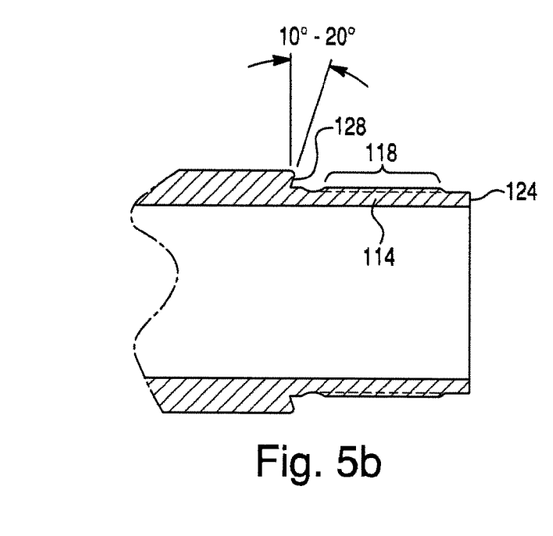
FIG. 5B is a further cross-sectional view of a male end connector to be used in conjunction with the female end connector of FIGS. 4A-4C in accordance with the first embodiment of the present invention.
Figure 5C:
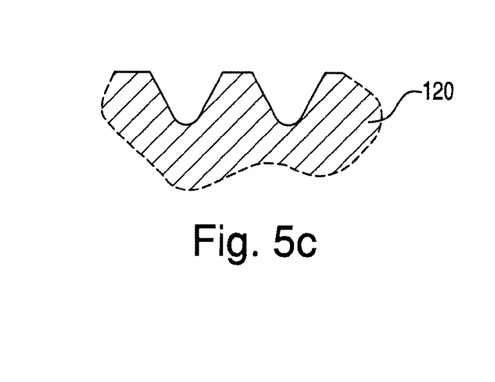
FIG. 5C is a detailed view of an external screw thread of the male connector of FIGS. 5A and 5B.

With reference to FIGS. 4A-4C, 5A-5C and 6, one embodiment of a connection means in accordance with a first embodiment of the present invention will now be described; in this embodiment the connection means is incorporated into a drilling jar. The connection means comprises an inner or male pin 114, which, when, connected resides within an outer or female box 116. A threaded portion 118 is provided on the outer circumference of the pin 114 and is formed such that it co-operates with a corresponding threaded portion 120 formed on the inner circumference of the box 116. As shown in FIGS. 4C and 5C, the threaded portions 118, 120 may include a V-shaped profile but could, in alternative embodiments, include square form, buttress, trapezoidal or acme type threads.

Figure 6:
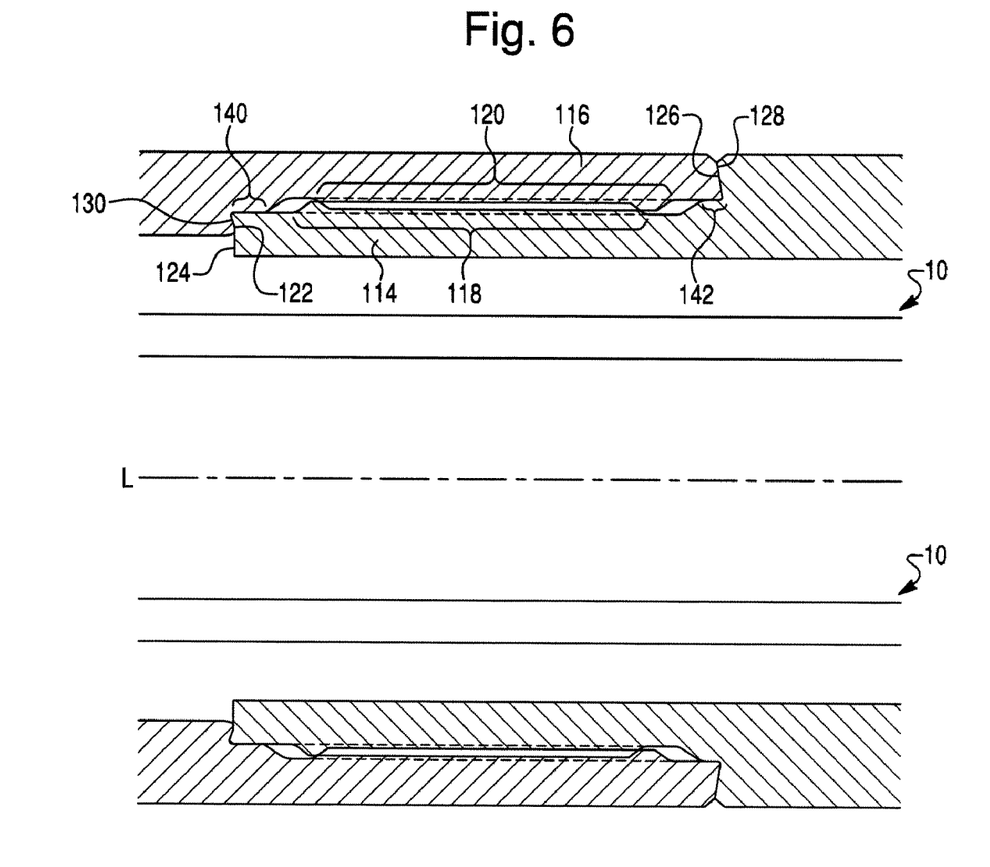
FIG. 6 is a detailed schematic diagram of a parallel threaded shoulder joint in accordance with the first embodiment of the present invention.

The threaded portions 118 and 120 are at or near parallel with the longitudinal axis L of the apparatus upon which the connection means is provided and thus are referred to as parallel threads (as opposed to tapered threads commonly used, for instance, in drill pipe connections). The pin 114 has a shallow 'v' shaped or gull winged shaped indentation on its longitudinally outermost end face (i.e. the leftmost portion of the pin shown in FIG. 6), which indentation comprises a tapered wall 122 and a flat wall 124 (as shown in FIG. 6) and which will provide a secondary shoulder surface as will be described subsequently. The tapered wall 122 is angled with respect the perpendicular axis to the longitudinal axis L of the male pin 114. As shown in FIG. 6, the tapered wall 122 is angled at approximately 15 degrees, from radially innermost to outermost, away from the rest of the pin 114 (i.e., the rest of the pin 114 to the right of the flat wall 124) and so is angled, from radially innermost to outermost, away from the parallel thread 118.

Pin 114 also has a box receiving shoulder 128, which is distal of the tapered wall 122 and which is located radially outer and longitudinally inner of the thread 118, where the shoulder 128 will provide a primary shoulder surface as will be described subsequently. The shoulder 128 is angled with respect an axis that is perpendicular to the longitudinal axis L of the male pin 114. Specifically, the shoulder 128 is angled, with respect to this perpendicular axis, at approximately 15 degrees (from radially innermost to outermost) toward the rest of the pin 114 (i.e., the rest of the pin 114 to the left of the shoulder 128) and, therefore, is angled (from radially innermost to outermost) toward the parallel thread 118. Accordingly, the thread 118 is located radially and longitudinally between the shoulder 128 and the tapered wall 122.

The outer box 116 has a single tapered face 126, which provides a primary shoulder surface and which is angled with respect to an axis perpendicular to the longitudinal axis L of the outer female box 116. The tapered face 126 is angled at approximately 15 degrees, from radially innermost to outermost, toward the rest of the outer female box 116 (i.e. the rest of the box 116 to the left of the tapered face 126) and so is angled, from radially innermost to outermost, toward the parallel thread 120 by substantially the same angle as that of the box receiving shoulder 128. The outer box 116 also has tapered pin receiving shoulder 130, which is distal of the tapered face 126, which is located radially and longitudinally inner of the female thread 120, and which will provide a secondary shoulder surface. As shown in FIG. 6, the pin receiving shoulder 130 is angled at approximately 15 degrees (from radially innermost to outermost) away from the rest of the box 116 (i.e., the rest of the box 116 to the right of the pin receiving shoulder 130) and, therefore, is angled (from radially innermost to outermost) away from the parallel thread 120. Thus, the tapered pin receiving shoulder 130 is provided with a substantially-similar taper angle as that of tapered wall 122. Accordingly, the thread 120 is located radially and longitudinally between the tapered face 126 and the tapered pin receiving shoulder 130.

It should be noted that box 116 is at least equal to, or slightly longer than the length of inner pin 114 as will be discussed subsequently.

Figure 1A:
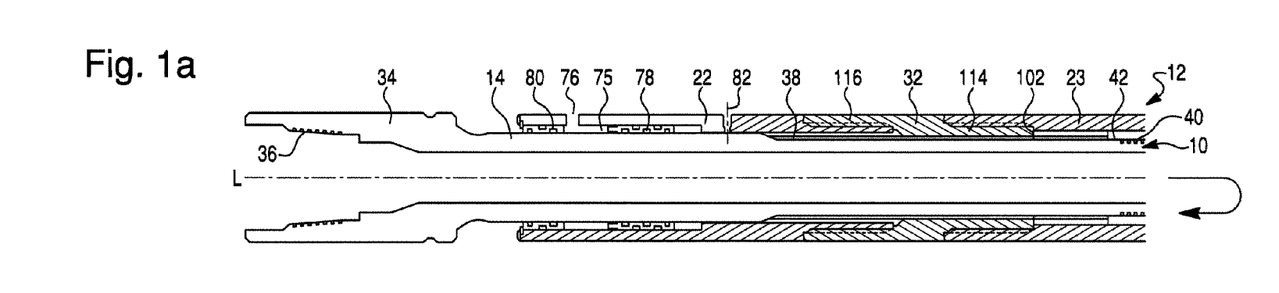
FIG. 1A is a cross-sectional view of an upper third of a drilling jar in accordance with a second embodiment of the present invention that employs connection means in accordance with a first embodiment of present invention.

As shown in FIG. 1A, the connection means may be provided on both ends of a double shouldered spline 32. Each double shouldered spline 32 comprises a pin 114 and box section 116 that respectively connect, in accordance with the first embodiment of the present invention, to a box and pin section of another component of the apparatus upon which the spline 32 is installed.

With respect to FIG. 6, pin 114 is screwed into the box section 116 when the downhole tool is assembled and threads 120 and 118 cooperate to cause tapered face 126 of the box 116 to abut against box receiving shoulder 128, thereby providing a primary (external of the thread) shoulder junction. This creates a metal to metal seal between the tapered face 126 and the shoulder 128 and also provides a primary shoulder between the pin 114 and box 116 into which torque can be delivered and stored.

Tapered wall 122 also abuts against pin receiving shoulder 130, thereby creating a secondary (internal of the thread) metal to metal seal between the tapered face 126 and the shoulder 128 and also providing a secondary shoulder joint between the pin 114 and the box 116 into which torque can be delivered and stored. However, as discussed previously, the length of box 116 is manufactured such that it is at least equal to that of pin 114, and may be slightly longer (e.g., about 0.15 mm) than the length of pin 114. This ensures that the seal created between face 126 and shoulder 128 is made before the seal between wall 122 and shoulder 130 and thus the seal between face 126 and shoulder 128 is regarded as the primary shoulder joint and the internal seal between the wall 122 and shoulder 130 is regarded as the secondary shoulder joint.

When the drill string is compressed when, for example, downward jarring is required (or tensioned when, for example, upward jarring is required) pin 114 is prevented from splaying inwardly toward the longitudinal axis L of the apparatus upon which the connection means is provided due to the abutment between the tapers on wall 122 and shoulder 130. The pin 114 is also prevented from diving outwardly (away from the longitudinal axis L) due to a support means in the form of support ledge 140 on the box section 116. The support ledge 140 is arranged to lie on an axis substantially parallel and co-axial to the longitudinal axis L of the female box section 116. As shown in FIG. 6, the support ledge 140 is arranged radially outwardly of and longitudinally outwardly of the pin receiving shoulder 130 and is, therefore, located radially inwardly of and longitudinally inwardly of the female thread 120.

Box section 116 is prevented from splaying outwardly away from the longitudinal axis L of the apparatus due to the taper on wall 126 and shoulder 128. The box 116 is also prevented from diving inwardly (toward longitudinal axis L) due to a support ledge 142 on the pin section 114. As shown in FIG. 6, the support ledge 142 is arranged radially inwardly of and longitudinally outwardly of the male shoulder 128 and is, therefore, located radially outwardly of and longitudinally inwardly of the male thread 118.

This provides a very secure joint that will withstand very high torsional forces without the pin 114 or box 116 sections splaying or diving inwardly/outwardly, as the combined effect of the support ledges 140, 142 and tapered surfaces 122/130, 126/128 substantially prevents movement of the male pin 114 and female box 116 in the radial direction. The joint created by the connection means also discourages unintentional backing off (i.e., unscrewing) of the components of the apparatus upon which the connection means is provided, as a large rotational force would be required to overcome the friction between the primary or external shoulder joint 126/128 (face 126 and wall 128) and secondary or internal shoulder joint 122/130 (face 122 and wall 130) once the desired make-up torque has been applied to the connection.

The parallel arrangement of threaded portions 118 and 120 allows a secure connection to be created between two tubular members while using a minimal amount of borehole space/radial distance, i.e., the joints do not encroach on the internal bore more than absolutely necessary, as no taper is required on the threaded portions 118 and 120.

In addition, the connection means prevents over stretching of the pin 114 and box 116 sections (which often occurs in standard tapered thread pin and box joints) from occurring both during connection of the tubular members and during operation of the drill string. Any tendency for the pin 114 or box 116 to over stretch is avoided by the inability of the pin 114 and box 116 to increase in length due to the respective shoulders 122/130 and 126/128.

Accordingly, the connection means permit a much higher level of torque to be applied to itself when screwing the connections together when compared to conventional connections, which is particularly useful in extended reach/horizontal wells.

Figure 1B:
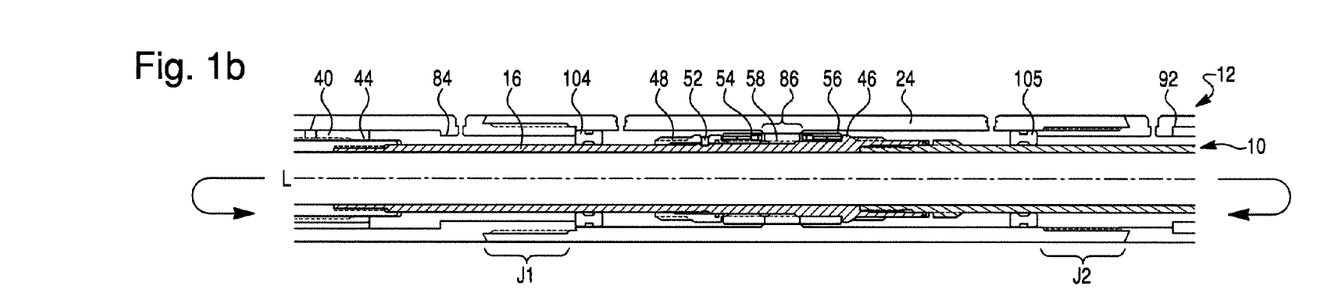
FIG. 1B is a cross-sectional view of a middle third of a drilling jar in accordance with the second embodiment of the present invention that employs the connection means in accordance with the first embodiment of present invention.
Figure 1C:
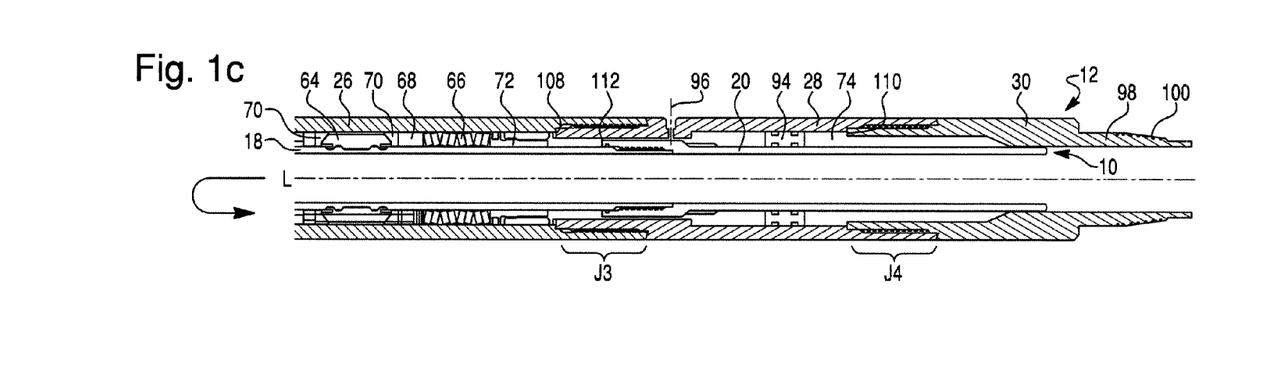
FIG. 1C is a cross-sectional view of a lower third of a drilling jar in accordance with the second embodiment of the present invention that employs the connection means in accordance with the first embodiment of present invention.

The connection means is not limited to use on the spline 32 and indeed the jar apparatus shown in FIGS. 1A-1C is provided with further joints J1, J2, J3 and J4 which each have a similarly tapered arrangement and threaded portions that are substantially parallel to the longitudinal axis L of the jar apparatus.

Use of the connection means on the drilling jar of FIGS. 1A-1C will now be described, though as previously stated the connection means is not limited to use on a drilling jar and indeed it may be used on virtually any tool or tubular member where a high torque connection between tubular members may be required, e.g., accelerators, drill pipe, flow circulation tools, shock tools, thrusters and bumper subs etc. and any other suitable BHA tools.

When viewed in conjunction with one another, FIGS. 1A-1C show a drilling jar as indicated by the connecting arrows.

The drilling jar shown in FIGS. 1A-1C comprises an internal body member or mandrel 10 surrounded by an external body member or housing 12. The internal mandrel 10 is arranged such that it may move axially with respect to the external housing 12 when it is required to do so.

The internal mandrel 10 is a substantially tubular member that spans the majority of the length from the upper to the lower end of the jar apparatus. The internal mandrel 10 comprises an uppermost connecting mandrel 14 connected at its lower end to a meter mandrel 16, which leads on to a locking mandrel 18 that finally connects to a lowermost end mandrel 20.

The external housing 12 comprises an uppermost seal housing 22 connected to an impact housing 23 which leads on to a meter housing 24 connected to a lock housing 26 which connects to a lower seal housing 28 which finally connects to a lowermost connecting housing 30. Each of the housings 24, 26 and 28 are connected via connection means in accordance with the first embodiment of the present invention and the uppermost seal housing 22 is connected to the impact housing 23 via the double shouldered spline 32 described previously, which is also in accordance with the first embodiment of the present invention.

The uppermost connecting mandrel 14 of the internal mandrel 10 has a box section 34 provided with a standard tapered thread portion 36, which allows connection to a pin section of the lower end of an upper portion of the drill string (not shown). The outer circumference of the box section 34 decreases in diameter to allow the connecting mandrel 14 to enter the external housing 12. Such box sections are common in the industry and suitable box sections include the HT-50 and XT56 connections provided by Grant Prideco and the WT-58 provided by Hydril. The mandrel 14 continues along the internal bore of the housing 12 until it reaches an indented portion 38 that comprises an arrangement of longitudinally extending and circumferentially spaced grooves, which telescopically engage with internally projecting splines mounted on the spline 32 to prevent rotation occurring between the internal mandrel 10 and external housing 12. At the lower portion of the connecting mandrel 14, a double headed hammer 40 is secured to the outer circumference of the mandrel 14. The hammer comprises a collar, which has upper 42 and lower 44 impact surfaces, and is manufactured such that it may be removed for maintenance or replacement.

Figure 3:
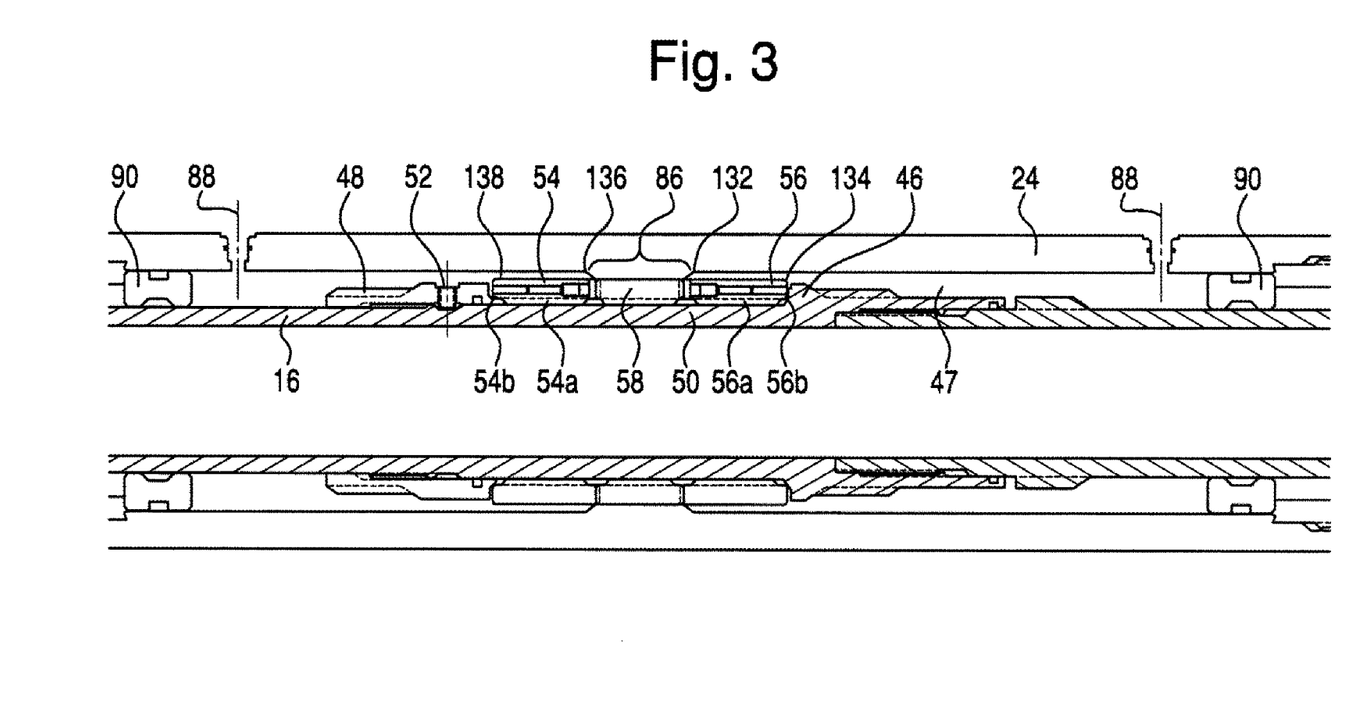
FIG. 3 is a detailed cross-sectional view of the metering mechanism located on the middle third of the drilling jar of FIG. 1B.

With respect to FIG. 3, the meter mandrel 16 has a shoulder 46. A raised diameter portion 50 is formed on the mandrel 16. A locking plate 48 is attached to the mandrel 16 via a grub screw 52. Situated between the shoulder 46 and the locking plate 48 are upper meter valve 54, lower meter valve 56, and a spacer collar 58. Although suitable meter valves are widely available, one-way valves such as the Jeva Jet™ provided by The Lee Company, USA may be particularly suitable.

Figure 2:
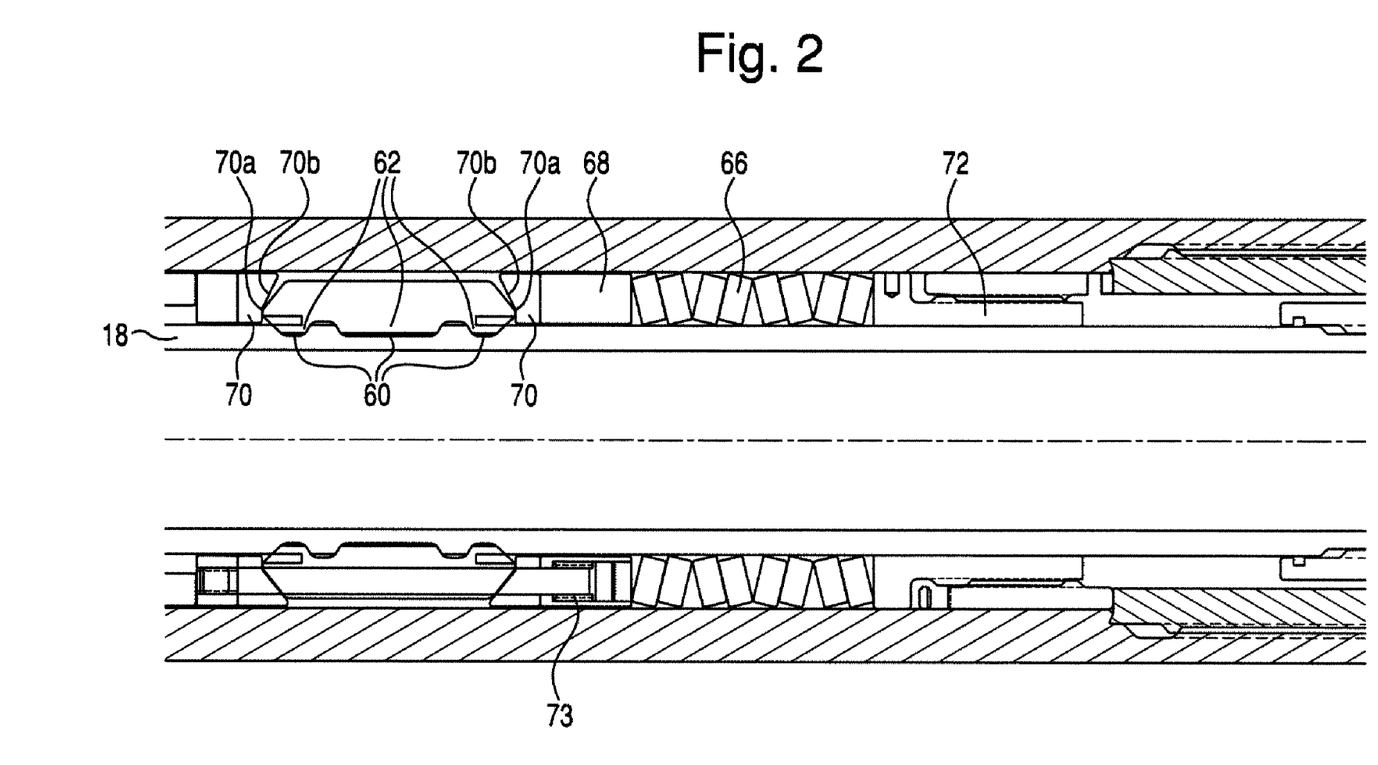
FIG. 2 is a detailed cross-sectional view of a locking mechanism located on the lower third of the drilling jar of FIG. 1C.

With respect to FIG. 2, the locking mandrel 18 has circumferentially arranged locking grooves or rings 60 formed on its outer surface that are adapted to coincide selectively with inwardly projecting locking teeth 62 provided on a locking block 64. A plurality of, such as six, locking blocks 64 are equi-spaced around the annulus between the internal mandrel 10 and external housing 12 in a cage like structure and are bounded at each upper and lower end by a respective inwardly facing tapered collar 70. The teeth 62 are held in the grooves 60 due to an inward force created by the action of compression springs 66 and pre-load spring 68 acting to push the tapered collars 70 toward one another. Each of the tapered collars 70 is provided with a highly tapered surface 70a and a shallow tapered surface 70b; the highly tapered surface 70a is radially inner of the shallow tapered surface 70b. The force exerted on the locking block 64 by the compression springs 66 can be varied by either screwing in or out an adjuster 72, which increases or decreases (as desired) the inwardly acting force on the locking block 64 due to the action of the tapered collars 70. The plurality of locking blocks 64 provided around the circumference of the locking mandrel 18 are each held apart by a circumferential spacer plate (not shown) and rods 73. This prevents the locking blocks 64 from falling to one side of the jar apparatus when, e.g., the jar apparatus is placed on its side on the rig for storage, or when the apparatus is used in a highly deviated well.

The end mandrel 20 (shown in FIG. 1C) creates a chamber 74 between the end mandrel 20 outer circumference and the external housing 12 internal circumference. The end mandrel 20 also provides additional weight to be used in the jarring process.

The uppermost seal housing 22 of the external housing 12 provides a fluid chamber 75 that is provided with a moveable balance piston 78 and a seal 80. A fluid port 76, which is open to the surrounding bore, is also provided through the wall of the uppermost seal housing 22. A plug 82 is provided on the seal housing 22 to obturate another part but which is located below the balance piston 78, such that hydraulic fluid can be inserted into the annulus between the external housing 12 and internal mandrel 10. This arrangement prevents any pressure differential from building-up across the wall of jar apparatus, as any increase in pressure below the piston 78 will be compensated by the piston 78 moving upwardly and any decrease in pressure below the piston 78 will be compensated by the piston 78 moving downward. This has the advantage of preventing build up of pressure (which may damage or otherwise adversely affect operation of the tool) in the apparatus, while avoiding hydraulic fluid in the apparatus from mixing with the oil/other material surrounding the apparatus.

The impact housing 23 is provided with an internal shoulder 84 that is positioned such that it provides an anvil against which the lower impact surface 44 of the hammer 40 may impact. A shoulder is provided on the spline 32 to provide an anvil against which the upper impact surface 42 of the hammer 40 may impact.

The meter housing 24 (best shown in FIG. 3) has a restricted portion 86 that projects inwardly from the internal circumference of the housing 24. The restricted portion 86 is positioned such that it coincides with the spacer collar 58 when the apparatus is in a neutral position, i.e., when the internal mandrel 10 has not been moved with respect to the external housing 12. The chamber created between the meter housing 24 and the meter mandrel 16 is filled with hydraulic fluid that is retained within this chamber due to the presence of plugs (not shown) in ports 88 and end seals 90 provided in the chamber, as seen in FIG. 3.

The lock housing 26 has a shoulder 92 that provides a point against which the compression spring arrangement 66 may act.

The lower seal housing 28 provides a fluid chamber 74 which has a moveable balance piston 94 located therein. A plug 96 is also provided on the seal housing 22. This arrangement prevents any pressure differential from building-up across the wall of apparatus by providing a similar compensation system to that previously described for the upper seal housing 22.

The lowermost connecting housing 30 has a pin section 98 provided with a standard tapered thread portion 100 that allows connection to a box section of the upper end of a lower portion of the drill string (not shown).

It should be noted that a series of inwardly protruding shoulders 102, 104, 106, 108 and 110 are created by the connection means provided between each of the components making up the external housing 12. Outwardly projecting shoulders 42 and 112 are also created on the internal mandrel 10 by the connections between each of the components making up the internal mandrel 10.

In operation, the jar apparatus is installed in the drill string prior to inserting the drill string downhole. In the event that the drill string becomes stuck downhole due to, for example, the drill bit becoming lodged in the formation being drilled, the jar apparatus can be brought into operation by the operator to free the drill bit from the formation.

Depending upon the nature of the jam between the drill bit and the formation, the operator may chose to jar the apparatus (and hence the drill string) in the upward or the downward direction, or a combination of both.

Starting from the neutral position, as shown in FIG. 3, to jar the drill string in the upward direction, the upper portion of the drill string is pulled upwardly by the operator via the drilling rig (not shown). This exerts an upward force on the internal mandrel 10 with respect to the external housing 12 (which is prevented from moving upwardly due to the stuck drill string (not shown)). When the upward force is greater than the lock setting force (which could be in the region of many tonnes) set by the compression springs 66, the locking block 64 moves outwardly until the locking teeth 62 disengage from the locking grooves 60. In this regard, the highly tapered surfaces 70a of the tapered collars 70 result in a relatively large force being required to move the locking block 64 outwardly. However, once the locking block 64 has moved outwardly it is held between shallow tapered surfaces 70b, which gently push the locking block 64 inwardly due to the action of the compression springs 66. This arrangement has the great advantage that it reduces friction on the locking mandrel 18, as the locking blocks 64 around the circumference of the locking mandrel 18 only grip the locking mandrel 18 lightly as the locking mandrel moves axially along the jar apparatus. With the locking block 64 moved outwardly, the internal mandrel 10 is now able to move with respect to the external housing 12.

The upward movement of the internal mandrel 10 pushes the upper 54 and lower 56 meter valves and the spacer collar 58 along the chamber 47 (which is filled with hydraulic fluid) due to the shoulder 46 on the meter mandrel 16. However, when the front end 132 of meter valve 56 reaches the restricted portion 86, the hydraulic fluid in the left hand side (as shown in FIG. 3) of chamber 47 is unable to pass around the outside of the meter valve 56. It should be noted that the dimension of the spacer collar 58 is such that hydraulic fluid may freely pass there around. For the internal mandrel 10 to continue traveling upwardly, the hydraulic fluid in the left hand side as viewed in FIG. 1B must pass through the meter valve 56, to equalize the pressure differential between the left and right hand side of chamber 47. As will be understood by the skilled reader, forcing hydraulic fluid through a meter in this way requires very large forces to be exerted on the meter 56 by the shoulder 46. This force is provided by using the drilling rig to pull upon the internal mandrel 10 via the drill string. The force on the meter 56 must be maintained until the back end 134 of the meter valve 56 has passed or cleared the restricted portion 86 of the outer housing 12. At this point, the hydraulic fluid (which will always tend to take the least path of resistance) will once again be able to pass freely between the outer diameter of the meter 56 and internal diameter of the external housing 12. The sudden decrease in force required to move the mandrel 10 upwardly results in the mandrel accelerating upwardly at high speed.

When the upper impact surface 42 of the double headed hammer 40 reaches the inwardly protruding shoulder 102, the inner mandrel 10 is stopped due to the impact between surface 42 and hammer 40. This causes the momentum of the inner mandrel 10 to be transferred to the outer housing 12. In this regard, the weight provided by the lowermost end mandrel 20 acts to increase the force exerted on the outer housing 12 due to the impact. The transfer of force to the outer housing 12 assists removal of the stuck drill bit from the formation.

Starting from the neutral position as shown in FIG. 3, to jar the drill string in the downward direction, the upper portion of the drill string is pushed downwardly by the operator via the drilling rig (not shown). This exerts a downward force on the internal mandrel 10 with respect to the external housing 12 (which is prevented from moving downwardly due to the stuck drill bit (not shown)). In a similar way to that previously described for the upward movement of the drill string, when the downward force is greater than the predetermined force set by the compression springs 66, the locking block 64 allows movement of the internal mandrel 10 with respect to the external housing 12. The downward movement of the internal mandrel 10 pushes the upper 54 and lower 56 meter valves and the spacer collar 58 down the chamber 47, due to the locking plate 48 on the meter mandrel 16. When the front end 136 of meter valve 54 reaches the restricted portion 86, the hydraulic fluid in the right hand side (as shown in FIG. 3) of chamber 47 is unable to pass around the outside of the meter valve 54. Therefore, for the internal mandrel 10 to continue traveling downwardly, the hydraulic fluid in the right hand side must pass through the meter valve 54, to equalize the pressure differential between the right and left hand side of chamber 47. As previously described, the downward force on the meter 54 must be maintained until the back end 138 of the meter valve 54 has passed the restricted portion 86 of the outer housing 12. At this point, the hydraulic fluid will once again be able to pass freely between the outer diameter of the meter 54 and internal diameter of the external housing 12. The sudden decrease in force required to move the mandrel 10 downward results in the mandrel accelerating downwardly at high speed.

When the lower impact surface 44 of the double headed hammer 40 reaches the inwardly protruding shoulder or anvil 84 the inner mandrel 10 is stopped due to the impact between surface 44 and hammer 40. This causes the momentum of the inner mandrel 10 to be transferred to the outer housing 12. Again, the weight provided by the lowermost end mandrel 20 acts to increase the force exerted on the outer housing 12 due to the impact. The transfer of force to the outer housing 12 assists removal of the stuck drill bit from the formation.

It should be noted that once the jar apparatus has been operated in either the upward or downward direction, the operator can return each valve 54, 56 through the restricted portion 86 in order to create a further impact. However, in this regard, the fluid can bypass the upper 54 and lower 56 meter valves by traveling along respective bypass passages 54a, 56a (which are blocked by respective metal to metal seals 54b, 56b when in the jarring mode). Thereafter, the locking block 64 will engage with the locking grooves 60 on the internal mandrel when the mandrel reaches the neutral position. This effectively allows the jarring procedure to be restarted from the neutral position when desired.

Although the aforementioned describes embodiments of the invention, the invention is not so restricted. For instance, the parallel threads 118, 120 could in certain circumstances, be replaced by linearly tapering threads if, for instance, increasing the radial extent of the connection was acceptable in a given downhole tool or other tubular member. It should also be noted that the outer circumference of the tubular members, which were described herein as being circular in cross-section, need not be so. Rather, the outer circumference of the tubular members could have other cross-section such, e.g., square, hexagonal, etc.; such alternate cross-sections may be particularly applicable in the areas in between the connection means.

In light of the foregoing, it will be apparent to those skilled in the art that various modifications and variations can be made to the disclosed embodiments of the present invention without departing from the scope or spirit of the invention. Accordingly, these other apparatuses and methods are fully within the scope of the claimed invention. Therefore, it should be understood that the apparatuses and methods described herein are illustrative only and are not limiting upon the scope of the invention, which is indicated by the following claims.

What is claimed is:

1. A bottom hole assembly tool component comprising a connection apparatus adapted to allow connection of one substantially tubular bottom hole assembly tool component member to another substantially tubular bottom hole assembly tool component member, the connection apparatus comprising:

a male connecting member having a thread thereon;

a female connecting member having a thread thereon;

wherein the threads of the male and female connecting members are arranged to screw together to form a co-operable attachment mechanism;

wherein the male and female connecting members each comprises at least one primary surface located at one end of the respective threads and are, together, adapted to form a primary load bearing shoulder joint such that each of the at least one primary surface of the male connecting member contacts at least one primary surface of the female connecting member at an angle greater than zero degrees to a longitudinal axis of the connection apparatus and further each comprises at least one secondary surface adapted to form a secondary load bearing shoulder joint such that each of the at least one secondary surface of the male connecting member contacts at least one secondary surface of the female connecting member at an angle greater than zero degrees to the longitudinal axis;

wherein the respective threads of the male and female connecting members are substantially parallel to the longitudinal axis and are located in between each of the respective at least one primary and secondary surfaces;

wherein each of the at least one primary surfaces of the male and female connecting members is formed at the same angle to the longitudinal axis of the male and female connecting members, respectively, wherein the secondary surfaces of each of the male and female connecting members are formed at the same angle to the longitudinal axis of the male and female connecting members, respectively, wherein each of the at least one secondary surface of the male connecting member comprises a longitudinally outermost end face and a tapered wall and a flat wall on the longitudinally outermost end face, the tapered wall being angled from radially innermost to outermost, away from the parallel threads, and wherein each of the at least one secondary surface of the male member is substantially perpendicular to the longitudinal axis.

2. The bottom hole assembly tool component according to claim 1, wherein the co-operable attachment mechanism retains each of the at least one primary and secondary surfaces of the male connecting member in abutment with the respective at least one primary and secondary surfaces of the female connecting member, thereby providing the respective primary and secondary joints between the male and female members.

3. The bottom hole assembly tool component according to claim 1, wherein a pair of butting surfaces are provided between each pair of primary and secondary surfaces and between the male and female members to resist rotation of the members with respect to one another.

4. The bottom hole assembly tool component according to claim 1, wherein the co-operable attachment mechanism formed by the threads urges each of the at least one primary and secondary surface of the connecting members into abutment with the corresponding surface of the other connecting member.

5. The bottom hole assembly tool component according to claim 1, wherein the co-operable attachment mechanism has a minimized radial extent such that the inner bore of the connecting members is substantially unrestricted at the location of the connecting members.

6. The bottom hole assembly tool component according to claim 1, wherein each of the at least one primary surface of the female member comprises a longitudinally outermost end of the female member and is provided at an end of the female member which is longitudinally and radially outer of the female member thread, and wherein each of the at least one secondary surface of the female member is distal of the longitudinally outermost end of the female member and is provided radially and longitudinally inner of the female thread.

7. The bottom hole assembly tool component according to claim 1, wherein each of the at least one secondary surface of the male member comprises a longitudinally outermost end of the male member and is provided at an end of the male member which is radially inner and longitudinally outer of the male thread, and wherein each of the at least one primary surface of the male member is distal of the longitudinally outermost end of the male member and is provided radially outer and longitudinally inner of the male thread.

8. The bottom hole assembly tool component according to claim 1, wherein each of the at least one primary surface of the male member comprises a tapered portion angled with respect to an axis perpendicular to the longitudinal axis of the male member and wherein the tapered portion is angled, from radially innermost to outermost, and wherein the tapered portion is angled in the direction toward the male thread.

9. The bottom hole assembly tool component according to claim 1, wherein each of the at least one primary surface of the female member comprises a tapered portion angled with respect to an axis perpendicular to the longitudinal axis of the female member, wherein the tapered portion is angled from radially innermost to outermost wherein the tapered portion is angled in the direction toward the female thread.

10. The bottom hole assembly tool component according to claim 1, wherein the longitudinally outermost end of the female member is substantially prevented from moving radially outward when connected to the male member.

11. The bottom hole assembly tool component according to claim 1, wherein the longitudinally outermost end of the male member is substantially prevented from moving radially inward when connected to the female member.

12. The bottom hole assembly tool component according to claim 1, wherein each of the at least one primary and secondary surfaces of the male and female connecting members further comprise a support surface, wherein the support surface is adapted to support respective longitudinally outermost ends of the male and female members when the connection apparatus is engaged such that the male member is substantially prevented from moving radially outward and the female member is substantially prevented from moving radially inward.

13. The bottom hole assembly tool component according to claim 12, wherein the support surface of each of the at least one primary and secondary surfaces of the male and female members is arranged to lie on an axis substantially parallel or co-axial to the longitudinal axis.

14. The bottom hole assembly tool component according to claim 13, wherein the support surface of each of the at least one primary surface of the male member is arranged radially inwardly of and longitudinally outwardly of the male member primary surface tapered portion and is further arranged radially outwardly of and longitudinally inwardly of the male thread, and wherein the support surface of each of the at least one secondary surface of the male member is arranged radially outwardly of and longitudinally inwardly of the male member secondary surface tapered portion and is further arranged radially inwardly of and longitudinally outwardly of the male thread.

15. The bottom hole assembly tool component according to claim 13, wherein the support surface of each of the at least one primary surface of the female member is arranged radially inwardly of and longitudinally inwardly of the female member primary surface tapered portion and is further arranged radially outwardly of and longitudinally outwardly of the female thread, and wherein the support surface of each of the at least one secondary surface of the female member is arranged radially outwardly of and longitudinally outwardly of the female member secondary surface tapered portion and is further arranged radially inwardly of and longitudinally inwardly of the female thread.

16. The bottom hole assembly tool component according to claim 1, wherein the male connecting member is provided on one end of a body member and the female member provided on the other thereby creating a double shouldered connection which is capable of remaining engaged when a high torque is applied to the connection.

17. The bottom hole assembly tool component according to claim 1, wherein the substantially tubular bottom hole assembly tool component members are members which are included in a drill string, and wherein the tubular members are selected from the group consisting of a drilling jar, an impact enhancing tool, a flow circulation tool, a shock tool, thrusters and bumper subs which are suitable bottom hole assembly tools.

18. The bottom hole tool assembly component according to claim 1, wherein the at least one secondary surface of the male member includes a tapered wall and a flat wall extending from the tapered wall and wherein the tapered wall and the flat wall are positioned radially outward from the longitudinal axis and the tapered wall is a greater distance from the longitudinal axis than the flat wall.

19. A male connecting member for a substantially tubular bottom hole assembly tool component member which is arranged for connection to a female connecting member of another substantially tubular bottom hole assembly tool component member, the male connecting member comprising:
  a substantially parallel thread thereon co-operable with a substantially parallel thread provided on the female connecting member wherein the threads of the male and female connecting members are arranged to screw together to form a co-operable attachment mechanism;
  at least one primary surface located at one end of the male member thread adapted to form a primary load bearing shoulder joint with at least one primary surface provided on the female member and located at one end of the female thread such that each of the at least one primary surface of the male connecting member contacts at least one primary surface of the female connecting member at an angle greater than zero degrees to a longitudinal axis; and
  at least one secondary surface located at the other end of the male member thread adapted to form a secondary load bearing shoulder joint with at least one secondary surface provided on the female member and located at the other end of the female thread such that each of the at least one secondary surface of the male connecting member contacts at least one secondary surface of the female connecting member at an angle greater than zero degrees to the longitudinal axis;
  wherein the substantially parallel thread of the male member is located in between each of the at least one primary and secondary surfaces of the male member;
  wherein each of the at least one primary surfaces of the male and female connecting members are formed at the same angle to the longitudinal axis of the male and female connecting members, respectively,
  wherein each of the at least one secondary surface of each of the male and female members is formed at the same angle to the longitudinal axis of the male and female connecting members, respectively, wherein each of the at least one secondary surface of the male member comprises a tapered wall and a flat wall on the longitudinally outermost end face thereof, the tapered wall being angled from radially innermost to outermost, away from the parallel threads, and wherein each of the at least one secondary surface of the male member is substantially perpendicular to the longitudinal axis.

20. The male connecting member according to claim 19, wherein the at least one secondary surface of the male member includes a tapered wall and a flat wall extending from the tapered wall and wherein the tapered wall and the flat wall are positioned radially outward from the longitudinal axis and the tapered wall is a greater distance from the longitudinal axis than the flat wall.

21. A female connecting member for a substantially tubular bottom hole assembly tool component member which is arranged for connection to a male connecting member of another substantially tubular bottom hole assembly tool component member, the female connecting member comprising:

a substantially parallel thread thereon co-operable with a substantially parallel thread provided on the male connecting member wherein the threads of the male and female connecting members are arranged to screw together to form a co-operable attachment mechanism;

at least one primary surface located at one end of the female member thread adapted to form a primary load bearing shoulder joint with at least one primary surface provided on the male member and located at one end of the male thread such that each of the at least one primary surface of the male connecting member contacts at least one primary surface of the female connecting member at an angle greater than zero degrees to a longitudinal axis; and at least one secondary surface located at the other end of the female member thread adapted to form a secondary load bearing shoulder joint with at least one secondary surface provided on the male member and located at the other end of the male thread such that each of the at least one secondary surface of the male connecting member contacts at least one secondary surface of the female connecting member at an angle greater than zero degrees to the longitudinal axis;

wherein the substantially parallel thread of the female member is located in between each of the at least one primary and secondary surfaces of the female member;

wherein each of the at least one primary surfaces of the female and male connecting members are formed at the same angle to the longitudinal axis of the female and male connecting members, respectively, wherein each of the at least one secondary surface of each of the female and male members are formed at the same angle to the longitudinal axis of the female and male connecting members, respectively, wherein each of the at least one secondary surface of the male member comprises a tapered wall and a flat wall on the longitudinally outermost end face thereof, the tapered wall being angled from radially innermost to outermost, away from the parallel threads, and wherein each of the at least one secondary surface of the male member is substantially perpendicular to the longitudinal axis.

22. The female connecting member according to claim 21, wherein the at least one secondary surface of the male member includes a tapered wall and a flat wall extending from the tapered wall and wherein the tapered wall and the flat wall are positioned radially outward from the longitudinal axis and the tapered wall is a greater distance from the longitudinal axis than the flat wall.

23. A bottom hole assembly tool component comprising a connection apparatus adapted to allow connection of one substantially tubular bottom hole assembly tool component member to another substantially tubular bottom hole assembly tool component member, the connection apparatus comprising:

a male connecting member having a thread thereon;

a female connecting member having a thread thereon;

wherein the threads of the male and female connecting members are arranged to screw together to form a co-operable attachment mechanism;

wherein the male and female connecting members each comprises at least one primary surface located at one end of the respective threads and are, together, adapted to form a primary load bearing shoulder joint such that each of the at least one primary surface of the male connecting member contacts at least one primary surface of the female connecting member at an angle greater than zero degrees to a longitudinal axis of the connection apparatus and further each comprises at least one secondary surface adapted to form a secondary load bearing shoulder joint such that each of the at least one secondary surface of the male connecting member contacts at least one secondary surface of the female connecting member at an angle greater than zero degrees to the longitudinal axis;

wherein the respective threads of the male and female connecting members are substantially parallel to a longitudinal axis of the connection apparatus and are located in between each of the respective at least one primary and secondary surfaces;

wherein each of the at least one primary surfaces of the male and female connecting members is formed at the same angle to the longitudinal axis of the male and female connecting members, respectively, wherein the each of the at least one secondary surfaces of each of the male and female connecting members are formed at the same angle to the longitudinal axis of the male and female connecting members, respectively, wherein each of the at least one primary and secondary surfaces of the male and female connecting member further comprise a support surface, said support surfaces extending between each of the at least one primary and secondary surfaces and the parallel threads of the male and female connecting members, and wherein each of the at least one secondary surface of the male member is substantially perpendicular to the longitudinal axis.

24. The bottom hole assembly tool component according to claim 23, wherein the at least one secondary surface of the male member includes a tapered wall and a flat wall extending from the tapered wall and wherein the tapered wall and the flat wall are positioned radially outward from the longitudinal axis and the tapered wall is a greater distance from the longitudinal axis than the flat wall.

25. A male connecting member for a substantially tubular bottom hole assembly tool component member which is arranged for connection to a female connecting member of another substantially tubular bottom hole assembly tool component member, the male connecting member comprising:

a substantially parallel thread thereon co-operable with a substantially parallel thread provided on the female connecting member wherein the threads of the male and female connecting members are arranged to screw together to form a co-operable attachment mechanism;

at least one primary surface located at one end of the male member thread adapted to form a primary load bearing shoulder joint with at least one primary surface provided on the female member and located at one end of the female thread such that each of the at least one primary surface of the male connecting member contacts at least one primary surface of the female connecting member at an angle greater than zero degrees to a longitudinal axis; and at least one secondary surface located at the other end of the male member thread adapted to form a secondary load bearing shoulder joint with at least one secondary surface provided on the female member and located at the other end of the female thread such that each of the at least one secondary surface of the male connecting member contacts at least one secondary surface of the female connecting member at an angle greater than zero degrees to the longitudinal axis;

wherein the substantially parallel thread of the male member is located in between each of the at least one primary and secondary surfaces of the male member;

wherein each of the at least one primary surfaces of the male and female connecting members are formed at the same angle to the longitudinal axis of the male and female connecting members, respectively, wherein each of the at least one secondary surface of each of the male and female members are formed at the same angle to the longitudinal axis of the male and female connecting members, respectively, wherein each of the at least one primary and secondary surfaces of the male and female connecting member further comprise a support surface, said support surfaces extending between each of the at least one primary and secondary surfaces and the parallel threads of the male and female connecting members, and wherein each of the at least one secondary surface of the male member is substantially perpendicular to the longitudinal axis.

26. The male connecting member according to claim 25, wherein the at least one secondary surface of the male member includes a tapered wall and a flat wall extending from the tapered wall and wherein the tapered wall and the flat wall are positioned radially outward from the longitudinal axis and the tapered wall is a greater distance from the longitudinal axis than the flat wall.

27. A female connecting member for a substantially tubular bottom hole assembly tool component member which is arranged for connection to a male connecting member of another substantially tubular bottom hole assembly tool component member, the female connecting member comprising:

a substantially parallel thread thereon co-operable with a substantially parallel thread provided on the male connecting member wherein the threads of the male and female connecting members are arranged to screw together to form a co-operable attachment mechanism;

at least one primary surface located at one end of the female member thread adapted to form a primary load bearing shoulder joint with at least one primary surface provided on the male member and located at one end of the male thread such that each of the at least one primary surface of the male connecting member contacts at least one primary surface of the female connecting member at an angle greater than zero degrees to a longitudinal axis; and at least one secondary surface located at the other end of the female member thread adapted to form a secondary load bearing shoulder joint with at least one secondary surface provided on the male member and located at the other end of the male thread such that each of the at least one secondary surface of the male connecting member contacts at least one secondary surface of the female connecting member at an angle greater than zero degrees to the longitudinal axis;

wherein the substantially parallel thread of the female member is located in between each of the at least one primary and secondary surfaces of the female member;

wherein each of the at least one primary surfaces of the female and male connecting members are formed at the same angle to the longitudinal axis of the female and male connecting members, respectively, wherein each of the at least one secondary surface of each of the female and male members are formed at the same angle to the longitudinal axis of the female and male connecting members, respectively, wherein each of the at least one primary and secondary surfaces of the male and female connecting member further comprise a support surface, said support surfaces extending between each of the at least one primary and secondary surfaces and the parallel threads of the male and female connecting members, and wherein each of the at least one secondary surface of the male member is substantially perpendicular to the longitudinal axis.

28. The female connecting member according to claim 27, wherein the at least one secondary surface of the male member includes a tapered wall and a flat wall extending from the tapered wall and wherein the tapered wall and the flat wall are positioned radially outward from the longitudinal axis and the tapered wall is a greater distance from the longitudinal axis than the flat wall.

* * * * *